W. R. SAUNDERS.
Shovel Plow.
No. 27,651.
Patented Mar. 27, 1860.
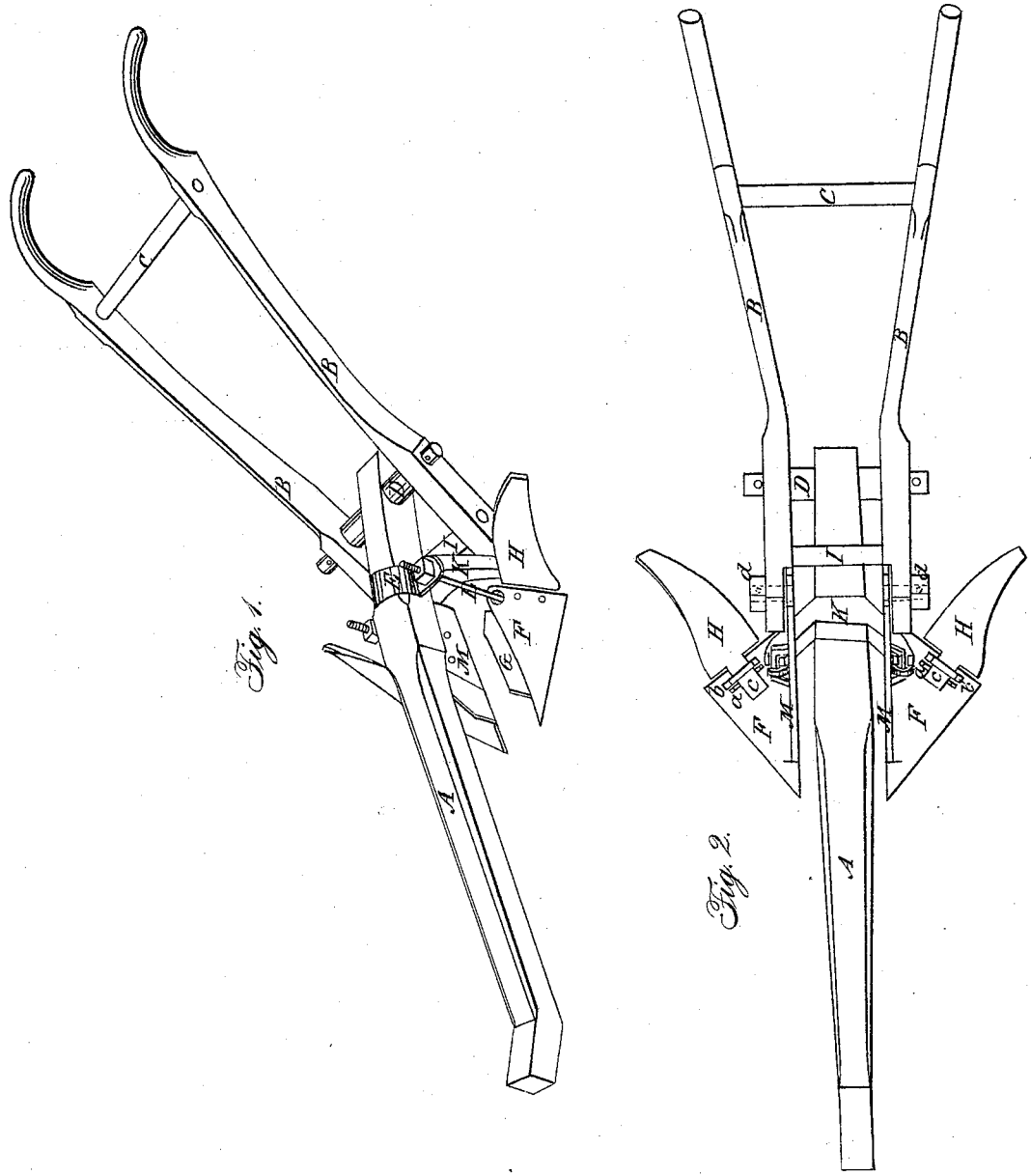
Witnesses:
Reuben Davis
T. W. W. Pulliam
Inventor:
William R. Sanders

UNITED STATES PATENT OFFICE.

WM. R. SAUNDERS, OF BUENA VISTA, MISSISSIPPI.

IMPROVEMENT IN PLOWS.

Specification forming part of Letters Patent No. 27,651, dated March 27, 1860.

*To all whom it may concern:*

Be it known that I, WILLIAM R. SAUNDERS, of Buena Vista, in the county of Chickasaw and State of Mississippi, have invented an Improved Double-Furrow Plow; and I do hereby declare the following to be a correct description of the same, reference being had to the accompanying drawings, in which—

Figure 1 is a perspective view of my improved double plow, showing its construction and operation; and Fig. 2, an inverted view of the same.

Similar letters of reference indicate corresponding parts in the two figures.

The nature of my invention consists in the peculiar arrangement of devices hereinafter set forth.

To enable others to make and use my improved plow, I will proceed to describe its construction and operation with reference to the drawings.

The beam A, handles B, braces C, D, and I are of the usual form and construction. There are two plows attached to the above-described beam, one on each side, for plowing of the cane, corn, or cotton at the same time, by means of the perpendicular standards or rods I, secured to landside or bar M, which pass through a perforation in the share and are secured to the yoke E on the beam by means of screws and nuts, as shown in the drawings. Each plow consists of a share, F, mold-board H, colter G, and landside or bar M, of the most approved form and construction. The mold-boards H are secured to the share F by wedge *a*, mortise *b*, and tenon *c*, as shown in the drawings, and being movable, either one or both may be removed at pleasure, as the case may require. The handles are secured to the beam by the horizontal brace D, which passes through a mortise in its rear end, as shown. The lower extremities of the oblique forked brace K rest in mortises in the landsides M, the top being secured in a groove in the under side of the beam A, where it is firmly held by the rods L. The shares F have a slight inclination forward at their outer edge, which serves to roll up the grass in front, instead of cutting it off, thereby allowing it to fall behind the shares when used without the mold-boards.

This plow operates as a surface-plow, and can be used advantageously during all stages of the cultivation of corn, cotton, tobacco, rice, pease, beans, and plants of every description planted in drills or rows, and, being well calculated for commencing the cultivation of a crop, may be used as soon as young plants spring from the earth, when both sides of the row may be worked at one operation with the shares, having first detached the mold-boards. This operation supersedes the necessity of hoeing, effects the same result with more uniformity and expedition, and removes all clods, stones, &c., thereby preventing the plants from being covered up. In plowing both sides of the plants the row will be between the horses and plows, when the mold-boards will throw the earth from the plants. Working between two rows, the mold-boards will throw the earth toward the row or against the plants, and working between the rows of plants without the mold-boards effects the same result as hoeing, but with more uniformity and expedition, and allows the pulverized earth to fall behind the shares.

The advantages of this plow are simplicity of construction, ready removal, and removal of parts, and durability.

Having described the construction and operation of my improved plow, what I claim as my invention, and desire to secure by Letters Patent, is—

The combination and arrangement of the shares F F, colters G G, and movable mold-boards H H with beam A, handles B B, yoke E, and the oblique forked brace K, the whole being constructed for operation as herein described.

WM. R. SAUNDERS.

Witnesses:
URIAH KUPY,
J. H. BASKIN.